May 1, 1962 W. F. BENDER 3,031,760
AUTOMATICALLY-CONTROLLED DENTAL SALIVA EJECTOR
Filed April 14, 1958 2 Sheets-Sheet 1
Fig.1.
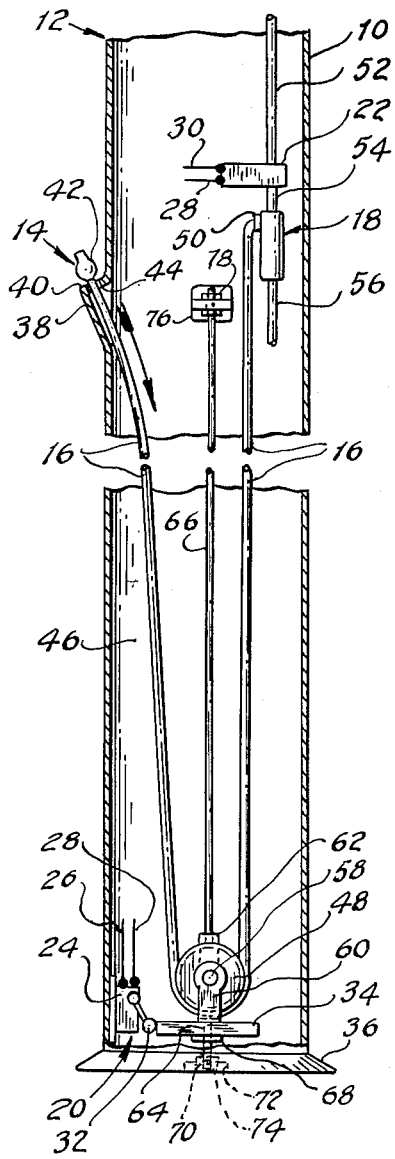
Fig.2.
Fig.3.
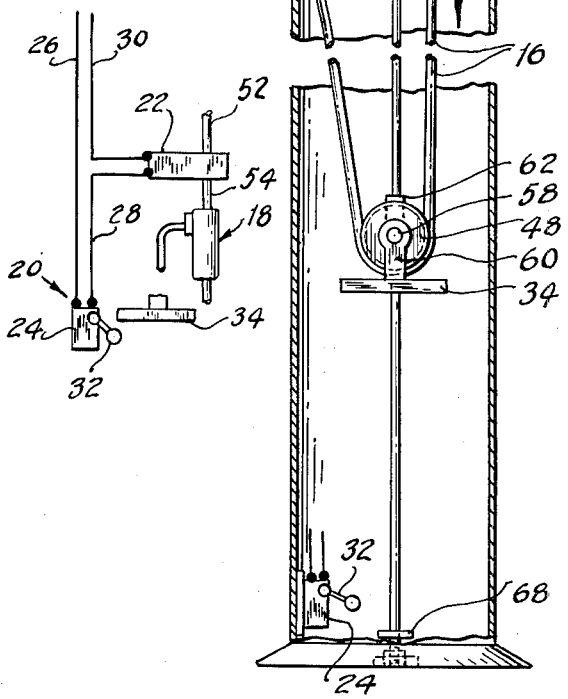
INVENTOR.
WILLIAM F. BENDER.
BY Barthel + Bugbee
ATTYS.

May 1, 1962  W. F. BENDER  3,031,760
AUTOMATICALLY-CONTROLLED DENTAL SALIVA EJECTOR
Filed April 14, 1958  2 Sheets-Sheet 2
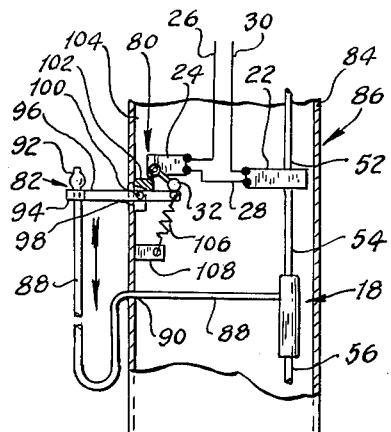
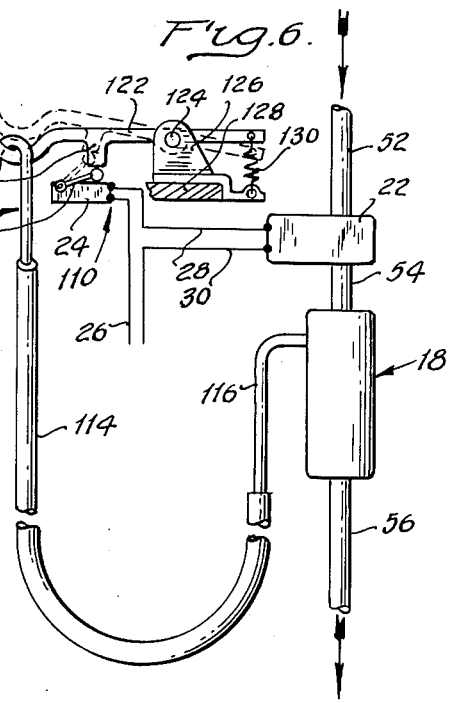
INVENTOR.
WILLIAM F. BENDER
BY Barthel + Bugbee
ATTYS.

United States Patent Office 3,031,760
Patented May 1, 1962

3,031,760
AUTOMATICALLY-CONTROLLED DENTAL SALIVA EJECTOR
William F. Bender, 1211 Brooklyn Ave., Ann Arbor, Mich.
Filed Apr. 14, 1958, Ser. No. 728,245
5 Claims. (Cl. 32—33)

This invention relates to dental units and, in particular, to saliva ejectors for such units.

One object of this invention is to provide a water-saving device for water-operated aspirators actuating a saliva ejector of a dental unit, whereby the water supply to the aspirator is automatically shut off when the saliva ejector is retracted and automatically turned on when the saliva ejector is pulled out for use.

Another object is to provide a water-saving device for water-operated aspirators of saliva ejectors, according to the preceding object, wherein the withdrawal of the saliva ejector from the upright dental unit housing actuates the water supply valve of the aspirator, either directly as by a hook lever upon which the saliva ejector is hung when out of use and connected directly to the water supply valve member (FIGURE 7) or indirectly by means of a micro-switch in circuit with a solenoidally-operated water supply valve (FIGURES 4, 5 and 6), or by a travelling weight and pulley connected to the saliva ejector tube (FIGURES 1 and 2).

Other objects and advantages of the invention will become apparent during the course of the following description of the accompanying drawings, wherein:

FIGURE 1 is a central vertical section through an upright dental unit housing containing a saliva ejector and water-operated aspirator equipped with a water-saving device according to one form of the present invention, with the saliva ejector in its retracted position and with the water automatically shut off;

FIGURE 2 is a view similar to FIGURE 1, but with the saliva ejector partially withdrawn for use and with the water-saving device actuated to turn on the water supply to the aspirator;

FIGURE 3 is a schematic wiring diagram of the electrical portion of the water-saving device of FIGURES 1 and 2;

FIGURE 4 is a central vertical section partly in side elevation of the vertical housing of another form of dental unit equipped with a modified form of water-saving device, with the saliva ejector out of use and the water shut off;

FIGURE 5 is a view similar to FIGURE 4, but with the saliva ejector withdrawn for use and with the water automatically turned on by the water-saving device;

FIGURE 6 is a simplified diagrammatic side elevation, partly in section, of a further modified water-saving device, with the dental unit housing omitted, and with the saliva ejector out of use and the water supply shut off and with the position of the saliva ejector supporting lever during use of the saliva ejector indicated in dotted lines; and FIGURE 7 is a simplified diagrammatic side elevation, partly in section, with the dental unit housing omitted, of a still further modified water-saving device, with the saliva ejector out of use and the water supply shut off, and with the position of the saliva ejector supporting lever during use of the saliva ejector indicated in dotted lines.

Hitherto, saliva ejectors, which are nozzles placed in the patient's mouth for removal of saliva accumulating therein during dental work and connected to a tube leading to a water-operated aspirator, have been provided with continuous suction by continuous operation of the aspirator. This has resulted in a waste of water because it is not convenient for the dentist to reach over the patient and turn off the water valve every time he removes the saliva ejector from the patient's mouth. This waste of water is particularly objectionable in places where water is scarce, such as in the southwestern states of the United States, and the continuous flow of such water when not needed causes unnecessary noise in the dental office.

The present invention provides a water-saving device for saliva ejectors which in any one of several different ways shown in the drawings automatically shuts off the water supply to the aspirator whenever the saliva ejector is removed from the patient's mouth and either permitted to return automatically to its retracted position or is placed by the dentist upon its intended holder while it is out of use. When, however, the dentist withdraws the saliva ejector from the dental housing, or lifts it off its storage hook, as the case may be, the water saving device of the present invention instantly comes into action to turn on the water supply to the aspirator and cause the latter to create the suction in the saliva ejector tube needed to withdraw the saliva from the patient's mouth.

Referring to the drawings in detail, FIGURES 1 and 2 show a hollow vertical housing 10 of a dental unit, generally designated 12, equipped with a saliva ejector, generally designated 14, on the end of a tube 16 connected to and operated by a water-actuated aspirator 18 equipped with a water-saving device, generally designated 20, according to the present invention as including an electromagnetic water supply valve 22 controlled by a micro-switch 24 through wires 26, 28 and 30 leading from a source of electric current (not shown) by way of a normally-closed micro-switch 24 to the electro-magnetic valve 22 (FIGURE 3), the microswitch 24 having a switch arm or tumbler 32 actuated by a traveling weight 34 which rises and falls in accordance with the withdrawal of the saliva ejector 14 for use or its retraction after use. The dental unit 12 is conventional and the equipment ordinarily found in the housing 10, other than that needed for use for the saliva ejector 14 and water-saving device 20 is omitted to simplify the showing of the invention.

The housing 10 in the unit 12 shown in FIGURES 1 and 2 is in the form of a hollow tubular upright resting upon a base 36 which in turn rests upon the floor of the dental office. The housing 10 on one side thereof has an upwardly-inclined hollow boss 38 having a top wall 40 forming a shelf for the nozzle 42 of the saliva ejector 14, a hole 44 being provided in the top wall 40 for the passage of the saliva ejector tube 16. The latter is of flexible resilient material, such as natural or synthetic rubber or synthetic plastic and passes downward through the chamber 46 within the housing 10 around a pulley 48, thence upward to a coupling 50 on the side of the aspirator 18. The aspirator 18 is conventional and well-known in the hydraulics art and its details are beyond the scope of the present invention. The aspirator 18 is operated by water received through a water supply pipe 52 which is connected to one side of the electro-magnetic valve 22 from the other side of which a water delivery pipe 54 runs to the aspirator 18, from the bottom of which a water and saliva discharge tube 56 runs to the usual outlet to the sewer.

The pulley 48 around which the saliva ejector tube 16 is trained is rotatably supported on an axle 58 mounted in a yoke 60 (FIGURE 1), the lower end of which has secured thereto the weight 34 which actuates the arm 32 of the micro-switch 24, as explained below in connection with the operaton of the invention. Secured to the yoke 60 to one side of the pulley 48 (behind it in FIGURES 1 and 2) is a tubular guide member 62 which extends downward to the weight 34, which is bored at 64 for the passage of a vertical guide rod 66 which also passes through the bore of the tubular guide member 62 and likewise through a stop collar 68 mounted on the guide rod 66 beneath the weight 34. The lower end of the guide rod 66 is threaded and passes through a bore 70 in the base 36 into a counterbore 72 where it is equipped with a threaded head 74 in the form of a nut seated in the counterbore 72. The upper end of the guide rod 66 is supported in any suitable way, such as, for example, by being threaded and passing through an apertured supporting bracket 76 to which it is secured by nuts 78, the bracket 76 in turn being secured to the inside of the housing 10. The tubular guide member 62 slidably engages the guide rod 66 to slide freely upward or downward therealong, as shown in the contrasting views of FIGURES 1 and 2.

In the operation of the form of the invention shown in FIGURES 1 and 2, let it be assumed that the saliva ejector 14 is temporarily out of use (FIGURE 1), with the result that its tube 16 has been retracted into the chamber 46 in the hollow vertical housing 10 in the direction of the arrow by the descent of the weight 34 carrying with it the pulley 48 downward until the weight 34 rests upon the stop 68, whereupon the saliva ejector nozzle 42 rests upon the top wall 40 of the hollow boss 38 (FIGURE 1). As a consequence of this action, the weight 34 has engaged the operating arm 32 of the normally-closed micro-switch 24 of the water-saving device 20 and moved it downward to its lowermost position, opening the circuit within the micro-switch 24. As a result, the supply of electric current from the current supply wires 26 and 30 (FIGURE 3) to the electro-magnetic valve 22 is cut off, de-energizing the solenoid thereof and permitting the spring or other counteracting member to move the valve 22 to its closed position, shutting off the flow of water from the water supply pipe 52 to the water delivery pipe 54. With the consequent shutting off of the water supply to the aspirator 18, the latter ceases to produce a suction in the saliva ejecor tube 16 and nozzle 42 of the saliva ejector 14. Thus, not only is the flow of water through the aspirator 18 automatically shut off by the retraction of the saliva ejector 14 but the noise created by the sound of the flowing water and suction is also terminated.

When the dentist has need of the saliva ejector 14, he grasps the nozzle 42 thereof, pulls it upward in the direction of the arrow in FIGURE 2, and inserts it in the patient's mouth in the usual way. As he pulls upward on the tube 16, the latter in turn pulls upward in the pulley 48, yoke 60 and weight 34, disengaging the latter from the switch arm 32 of the micro-switch 24. As a result, the spring (not shown) within the micro-switch 24 urges the arm 32 into its extended position, closing the normally-closed micro-switch 24 and consequently closing the energization circuit from the current supply lines 26 and 30 to the electromagnetic valve 22 (FIGURE 3). The consequent energization of the solenoid or other electrical operating device of the electro-magnetic valve 22 shifts the valve member thereof to open the valve 22, resulting in the flow of water from the water supply pipe 52 through the water delivery pipe 54 into the water-operated aspirator 18 and thence downward through the discharge pipe 56. The passage of water through the aspirator 18 creates a suction in the saliva ejector tube 16 and nozzle 42, withdrawing the saliva from the patient's mouth and discharging it into the water discharge pipe 56.

The water contaimues to flow through the aspirator 18 as long as the saliva ejector 14 is in its extended position withdrawn from the housing 10. When the dentist removes the nozzle 42 from the patient's mouth and releases the tube 16, the weight 34 pulls the yoke 60 and pulley 48 downward under the force of gravity, causing the tube 16 to be retracted into the chamber 46 until the weight 34 encounters the stop collar 68 to halt its descent. The nozzle 42 comes to rest upon the shelf or top wall 40 of the boss 38 and at the same time, the engagement of the weight 34 with the switch arm 32 opens the circuit through the micro-switch 24 and de-energizes the water-saving device 20, with the result that the de-energized electro-magnetic valve 22 closes, shutting off the flow of water from the water supply pipe 52 to the water delivery pipe 54. Consequently, the aspirator 18 ceases to create a suction in the tube 16 with a consequent cessation of the noise both of the suction and water flow and resulting in a saving of the water which would otherwise be lost without the presence and use of the water-saving device 20 of the present invention.

The water-saving device, generally designated 80, shown in FIGURES 4 and 5 for the saliva ejector 82 as applied to the housing 84 of a dental unit 86 is of a different type than the dental unit 12 of FIGURES 1 and 2, but has certain features in common with the water-saving device 20, these similar elements being designated by the same reference numerals. Among these are the electromagnetic valve 22, the normally-closed micro-switch 24 with its switch arm 32, the current supply wires 26, 28 and 30 extending therebetween, the water supply, delivery and discharge pipes 52, 54 and 56 and the water-operated aspirator 18. In the saliva ejector 82 of FIGURES 4 and 5, however, the flexible saliva ejector tube 88 passes through a hole 90 in the housing 84 and extends directly to the saliva ejector nozzle 92, which hangs upon the yoke-shaped or U-shaped end 94 of a saliva ejector supporting lever 96. The lever 96 passes through a hole 98 in the housing 84 and is pivotally supported on a pivot pin 100 carried by a bracket 102 secured to the inside of the housing 84, as is also the microswitch 24. Connected to the inner end of the lever 96 within the housing chamber 104 is a tension spring 106, the lower end of which is connected to a spring anchorage arm 108 which in turn is secured to the inside of the housing 84.

In the operation of the modified water-saving device 80 of the saliva ejector 82 of FIGURES 4 and 5, let it be assumed, as before, that the saliva ejector 82 is temporarily out of use with its nozzle 92 resting upon the U-shaped end 94 of the supporting lever 96, with the weight of the nozzle 92 and exposed portion of the tube 88 urging the tube 88 and exposed portion of the lever 96 downward in the direction of the arrow in FIGURE 4, overcoming the force of the spring 106 and shifting the arm 32 of the normally-closed micro-switch 24 into its open circuit position. The opening of the normally-closed micro-switch 24 opens the circuit between the lines 26 and 28 leading to the electro-magnetic switch 22, causing the latter to close in the manner set forth above and shutting off the flow of water from the pipe 52 to the pipe 54 and aspirator 18 and consequently terminating the suction through the tube 88 and nozzle 92. This action causes cessation of the noise of the suction and water flow and saves the water which would otherwise be wasted during the non-use of the saliva ejector 82.

To use the saliva ejector 82, the dentist pulls upward in the direction of the arrow in FIGURE 5 upon the nozzle 92 and tube 88 (FIGURE 5), lifting it off the U-shaped rest 94 on the lever 96 and inserting it in the patient's mouth. The release of the lever 96 causes it to swing clockwise around its pivot pin 100 by the force of the spring 106, releasing the switch arm 32 of the micro-switch 24, causing the latter to assume its normally-closed position. The closing of the micro-switch 24 closes the circuit between the current supply line 26 and the line 28 leading by way of the electro-magnetic valve 22 to the current supply line 30, and opening the valve 22. As a result, water flows from the water supply pipe 52 to the water delivery pipe 54 and thence through the aspirator 18 and water discharge pipe 56 in the direction of the right-hand arrows in FIGURE 5, causing suction to be produced in the pipe 88 and nozzle 92 of the saliva ejector 82 which thereupon removes the saliva from the patient's mouth and discharges it through the tube 88 and aspirator 18 to the discharge pipe 56. Removal of the nozzle 92 from the patient's mouth and its replacement upon the rest portion 94 of the lever 96 swings the latter back to its horizontal position of FIGURE 4, de-energizing the micro-switch 24 and electro-magnetic valve 22, halting the flow of water through the delivery pipe 54 and the production of suction in the saliva ejector pipe 88, silencing the apparatus.

The water-saving device, generally designated 110, of the saliva ejector 112 of FIGURE 6 is of slightly different construction but of similar action to the water-saving device 80 of FIGURE 5 and similar parts are designated with the same reference numerals. Here, however, the saliva ejector 112 is of a slightly different type, consisting of a flexible tube 114 connected to the end of an L-shaped pipe 116 of the aspirator 18 and having an inverted J-shaped or hook-shaped nozzle 118 hung upon the hook end 120 of a hook lever 122. The latter is pivotally supported upon a pivot pin 124 mounted in a bracket 126 carried by a shelf 128 inside the dental unit housing (not shown). A tension spring 130 urges the hook lever 122 into its dotted line position in FIGURE 6 but the latter is counterurged into its solid line position by the weight of the nozzle 118 and tube 114 so as to cause the lug 132 on the hook lever 122 to depress the switch arm 32 of the normally-closed micro-switch 24 to shift it into open circuit position, deenergizing the electro-magnetic valve 22 and shutting off the flow of water to the aspirator 18 in the manner previously described with a consequent termination of the production of suction in the saliva ejector tube 114 and nozzle 112. Upon lifting the saliva nozzle 118 off the hook lever 122, the latter is pulled to its dotted line position by the spring 130, permitting the micro-switch 24 to close the energization circuit of the electro-magnetic valve 22. The consequent flow of water through the aspirator 18 and production of suction in the tube 114 and nozzle 118 of the saliva ejector 112 removes the saliva from the patient's mouth as before.

The water-saving device, generally designated 140, has the hook nozzle 118 of the saliva ejector 112 shown in FIGURE 7 hanging upon the hooked end 142 of a hook arm 144 connected directly to the rotary valve member 146 of the water supply valve 148, the hook arm 142 being urged upward into its dotted line position by a compression spring 150 supported on a bracket 152 extending horizontally from the casing 154 of the water supply valve 148. Water supply, delivery and discharge pipes 52, 54 and 56 respectively serve the aspirator 18 as before, which as in FIGURE 6 has a pipe 116 leading to a flexible tube 114 connected to the nozzle 118 of the saliva ejector 112. The valve casing 154 has diametrically opposite ports 156 and 158 aligned with the pipes 52 and 54 and the rotary valve member 146 has a cross bore 160 alignable with the ports 156 and 158 in the raised position of the member 146.

In operation, the weight of the nozzle 118 and saliva ejector tube 114 overcomes the thrust of the compression spring 150 and pulls the hook arm 144 downward, rotating the cross-bore 160 of the rotary valve member 146 into alignment with the ports 156 and 158 so as to cause flow of water therethrough from the supply pipe 52 to the delivery pipe 54 and thence through the aspirator 18 into the discharge pipe 56, creating suction in the tube 114 and nozzle 118 of the saliva ejector 112 and removing the saliva from the patient's mouth. Hanging the hook nozzle 118 after use upon the hook lever 144 swings the latter downward into its solid line position, rotating the cross-bore 160 of the valve member 146 out of alignment with the ports 156 and 158 and thereby cutting off the flow of water through the rotary valve 148 and consequently terminating the production of suction in the tube 114 and nozzle 118 of the saliva ejector 112. As a result, water is saved when the saliva ejector 112 is out of use, and the noise of the flowing water and suction is eliminated.

What I claim is:

1. In a dental apparatus, the combination with a supporting structure having a water supply pipe connected thereto, of a water control valve connected to said supply pipe and having a valve element therein movable between open and closed positions, a water-operated aspirator connected to said valve and having a suction connection, a flexible saliva ejector tube mounted for lengthwise motion relatively to said supporting structure and connected to said suction connection, said saliva ejector tube being movable lengthwise between an inoperative retracted position on said supporting structure and an operative extended position withdrawn from said supporting structure, and means operatively engaged by the exterior of said tube in unobstructing relationship with the flow of water through said tube and responsive to the withdrawal of said tube from said supporting structure for shifting said valve element to its open position effecting flow of water through said tube to said aspirator and responsive to the retraction of said tube to said supporting structure for shifting said valve element to its closed position terminating flow of water through said tube, said valve member having a valve-operating arm operatively connected thereto and said saliva ejector tube in its retracted position being hung on said arm and swinging said arm to rotate said valve element to its closed position.

2. The combination set forth in claim 1, wherein the saliva tube has a hook portion near the mouth-inserted end thereof and wherein said arm near the end thereof remote from said valve element has a recess receiving said hook portion.

3. In a dental apparatus, the combination with a supporting structure having a water supply pipe connected thereto, of a water control valve connected to said supply pipe and having a valve element therein movable between open and closed positions, an electrical valve actuator operatively connected to said valve element and effective upon energization to shift said valve element from its closed position terminating flow of water through said tube to its open position effecting flow of water through said tube, a water-operated aspirator connected to said valve and having a suction connection, a flexible saliva ejector tube mounted for lengthwise motion relatively to said supporting structure and connected to said suction connection, said saliva ejector tube being movable lengthwise between an inoperative retracted position on said supporting structure and an operative extended position withdrawn from said supporting structure, an energization circuit connected to said actuator and adapted to be connected to a source of electric current, and switch means connected to said energization circuit and including a switch operator operatively engaged by the exterior of said tube in unobstructing relationship with the flow of water through said tube and responsive to the withdrawal of said tube from said supporting structure for closing said energization circuit and responsive to the retraction of said tube to said supporting structure for opening said energization circuit, said supporting structure including a movable saliva tube rest movable into and out of operative engagement with said switch means and adapted to receive said saliva tube in supporting relationship therewith and responsive to the weight of said tube thereon to actuate said switch means.

4. The combination set forth in claim 3, wherein a resilient element is mounted on said supporting structure and connected to said rest to impart thereto a force opposing the force applied thereto by the weight of said supporting tube but less than said weight-applied force.

5. The combination set forth in claim 3 wherein said tube rest comprises a lever pivotally mounted on a part of said supporting structure and having a portion movable into and out of operating engagement with said switch means.

References Cited in the file of this patent

UNITED STATES PATENTS

| | | |
|---|---|---|
| 1,214,433 | Crane et al. | Jan. 30, 1917 |
| 1,719,306 | Pieper et al. | July 2, 1929 |